(12) United States Patent
Nakashima et al.

(10) Patent No.: US 11,128,235 B2
(45) Date of Patent: Sep. 21, 2021

(54) POWER CONVERSION DEVICE

(71) Applicant: Mitsubishi Electric Corporation, Tokyo (JP)

(72) Inventors: Yukio Nakashima, Tokyo (JP); Takayoshi Miki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 147 days.

(21) Appl. No.: 16/478,627

(22) PCT Filed: Jan. 27, 2017

(86) PCT No.: PCT/JP2017/003032
§ 371 (c)(1),
(2) Date: Jul. 17, 2019

(87) PCT Pub. No.: WO2018/138889
PCT Pub. Date: Aug. 2, 2018

(65) Prior Publication Data
US 2021/0135598 A1 May 6, 2021

(51) Int. Cl.
*H02M 7/5387* (2007.01)
*H02M 7/00* (2006.01)
(Continued)

(52) U.S. Cl.
CPC ....... *H02M 7/53871* (2013.01); *H02M 7/003* (2013.01); *H02M 7/493* (2013.01); *H02P 27/08* (2013.01)

(58) Field of Classification Search
CPC .. H02M 7/5387; H02M 7/53871; H02M 7/00; H02M 7/003; H02M 7/48; H02M 7/483; H02M 7/493; H02P 27/08
See application file for complete search history.

(56) References Cited

U.S. PATENT DOCUMENTS 7,872,888 B2 * 1/2011 Kuzumaki .......... H02M 7/5388
363/98
2003/0223179 A1 * 12/2003 Mishima ................ H01G 9/008
361/520

(Continued)

FOREIGN PATENT DOCUMENTS

JP 2003018863 A 1/2003
JP 2008228502 A 9/2008
(Continued)

OTHER PUBLICATIONS

Office Action dated Aug. 4, 2020, issued in corresponding Chinese Patent Application No. 201780084235.5, 12 pages including 6 pages of English translation.

(Continued)

*Primary Examiner* — Adolf D Berhane
(74) *Attorney, Agent, or Firm* — Buchanan Ingersoll & Rooney PC

(57) ABSTRACT

A power conversion device includes six semiconductor modules. Each of the six semiconductor modules includes a first terminal (P), a second terminal (N), and a third terminal (AC) on its surface. The first terminals of two semiconductor modules configuring a semiconductor module group of the same phase are arranged to be opposed to each other. A plurality of semiconductor module groups are arranged in a direction perpendicular to an arrangement direction of two semiconductor modules in the semiconductor module group.

16 Claims, 7 Drawing Sheets

(51) Int. Cl.
    *H02M 7/493*    (2007.01)
    *H02P 27/08*    (2006.01)

(56)           References Cited

U.S. PATENT DOCUMENTS

2007/0252169  A1*  11/2007  Tokuyama ............ H01G 4/224
                                                      257/162
2008/0225487  A1    9/2008  Nakajima et al.

FOREIGN PATENT DOCUMENTS

JP          2010011605  A    1/2010
JP          2015089244  A    5/2015
JP          2015089245  A    5/2015
JP          2015104248  A    6/2015
JP          2015142472  A    8/2015

OTHER PUBLICATIONS

Office Action dated Oct. 27, 2020 in Indian Patent Application No. 201947026967, 5 pages.
International Search Report (with English translation) and Written Opinion issued in corresponding International Patent Application No. PCT/JP2017/003032, 8 pages (dated Apr. 11, 2017).
Office Action dated Mar. 16, 2021, by the Chinese Patent Office in corresponding Chinese Patent Application No. 201780084235.5 and English translation of the Office Action. (18 pages).

* cited by examiner

POWER CONVERSION DEVICE

FIELD

The present invention relates to a power conversion device that uses a semiconductor module including a pair of a positive-electrode side semiconductor switching element and a negative-electrode side semiconductor switching element that are connected in series to each other.

BACKGROUND

In recent years, a large-capacity semiconductor module has been achieved as a result of development of semiconductor technology, and a semiconductor module has been widespread which includes a pair of a positive-electrode side semiconductor switching element and a negative-electrode side semiconductor switching element that configure an upper arm and a lower arm for one phase of an inverter and are integrated with each other. This type of semiconductor module is called "2-in-1 module".

In order to further increase the capacity, 2-in-1 modules may be arranged in parallel to configure a module for one phase. In this case, it is necessary to arrange six 2-in-1 modules in order to configure a power conversion device by using two inverters for driving a motor for three phases, that is, two three-phase inverters.

Under the technological background as described above, Patent Literature 1 described below discloses a configuration in which two three-phase inverters are accommodated in one housing.

CITATION LIST

Patent Literature

Patent Literature 1: Japanese Patent Application Laid-open No. 2015-89244

SUMMARY

Technical Problem

Patent Literature 1 is directed to downsizing and reduction of the installation area. However, Patent Literature 1 employs a configuration in which a busbar is used for connecting one of two parallel-arranged semiconductor modules and the other to each other and is screwed to terminals of the semiconductor modules. Therefore, the distance between the two parallel-arranged semiconductor modules cannot be reduced sufficiently, and there is room for further improvement related to downsizing.

The present invention has been achieved in view of the above problems, and an object of the present invention is to provide a power conversion device that can reduce the distance between two parallel-arranged semiconductor modules to achieve further downsizing.

Solution to Problem

In order to solve the above problems and achieve the object, a power conversion device according to the present invention using a semiconductor module that includes a pair of semiconductor switching elements connected in series to each other, including the semiconductor modules number of which is an even number of four or more. The semiconductor module includes a first terminal, a second terminal, and a third terminal on its surface, a positive electrode of a positive-side switching element is electrically connected to the first terminal, a negative electrode of a negative-side switching element is electrically connected to the second terminal, and a negative electrode of the positive-side switching element and a positive electrode of the negative-side switching element are electrically connected to the third terminal. First terminals, second terminals, or third terminals of two semiconductor modules configuring a semiconductor module group of a same phase among the semiconductor modules number of which is an even number of four or more are arranged to be opposed to each other, and plurality of the semiconductor module groups are arranged in a direction perpendicular to an arrangement direction of two semiconductor modules in the semiconductor module group.

Advantageous Effects of Invention

According to the present invention, there is an effect where the distance between two parallel-arranged semiconductor modules is reduced to achieve further downsizing.

DESCRIPTION OF EMBODIMENTS

A power conversion device according to embodiments of the present invention will be described in detail below with reference to the accompanying drawings. The present invention is not limited to the embodiments.

First Embodiment

Figure 1:
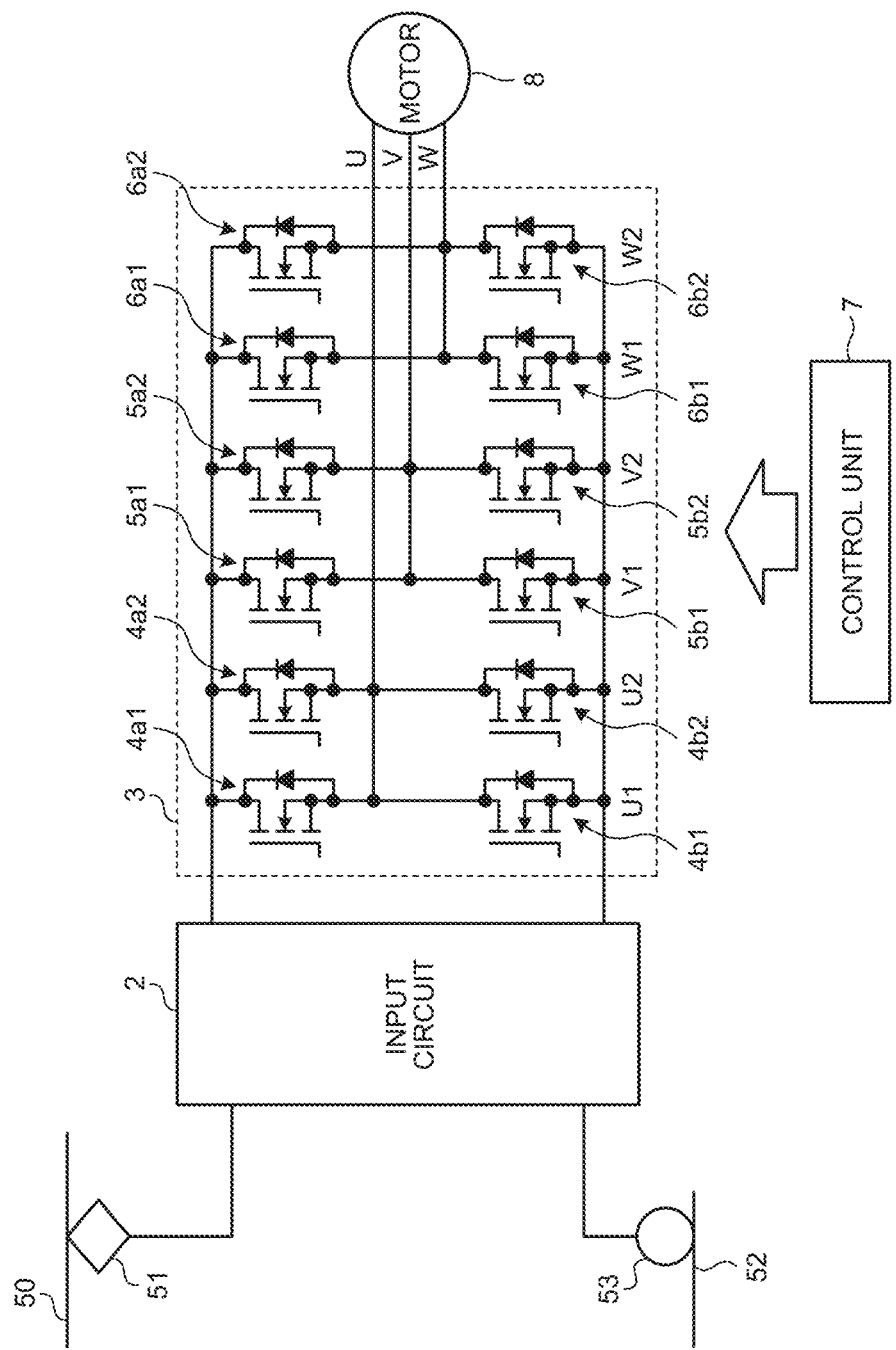
FIG. 1 is a circuit diagram illustrating a configuration example of a power conversion device according to a first embodiment.

FIG. 1 is a circuit diagram illustrating a configuration example of a power conversion device according to a first embodiment. In FIG. 1, the power conversion device according to the first, embodiment includes an input, circuit 2, an inverter circuit 3, and a control unit 7. The input circuit 2 includes at least a switch, a filter capacitor, and a filter reactor. The inverter circuit 3 includes switching elements 4*a*1, 4*a*2, 5*a*1, 5*a*2, 6*a*1, 6*a*2, 4*b*1, 4*b*2, 5*b*1, 5*b*2, 6*b*1, and 6b2, and at least one motor 8 is connected to the inverter circuit 3. The control unit 7 generates and outputs a PWM signal for controlling the switching elements 4a1, 4a2, 5a1, 5a2, 6a1, 6a2, 4b1, 4b2, 5b1, 5b2, 6b1, and 6b2. An example of the motor 8 connected to the inverter circuit 3 is an induction motor or a synchronous motor.

Further, in FIG. 1, one end of the input circuit 2 is connected to an overhead line 50 via a current collector 51, and the other end is connected to a rail 52 that supplies a ground potential via a wheel 53. Direct-current power or alternating-current power supplied from the overhead line 50 is supplied to an input end of the input circuit 2 via the current collector 51, and power generated at an output end of the input circuit 2 is supplied to the inverter circuit 3.

In the inverter circuit 3, the switching element 4a1 that is a positive-side switching element and the switching element 4b1 that is a negative-side switching element are connected in series to each other to configure a first leg of a U-phase, and the switching element 4a2 that is a positive-side switching element and the switching element 4b2 that is a negative-side switching element are connected in series to each other to configure a second leg of the U-phase. The positive-side switching element is also called "positive-side arm" or "upper arm". The negative-side switching element is also called "negative-side arm" or "lower arm". Further, the first leg of the U-phase is denoted by U1, and the second leg of the U-phase is denoted by U2.

Same descriptions are also applied to legs of a V-phase and a W-phase. Similarly, the switching element 5a1 and the switching element 5b1 are connected in series to each other to configure a first leg of the V-phase, and the switching element 5a2 and the switching element 5b2 are connected in series to each other to configure a second leg of the V-phase. The switching element 6a1 and the switching element 6b1 are connected in series to each other to configure a first leg of the W-phase, and the switching element 6a2 and the switching element 6b2 are connected in series to each other to configure a second leg of the W-phase. Similarly to the U-phase, the first leg of the V-phase is denoted by V1, the second leg of the V-phase is denoted by V2, the first leg of the W-phase is denoted by W1, and the second leg of the W-phase is denoted by W2.

In this manner, the inverter circuit 3 configures a three-phase inverter circuit in which the first leg and the second leg of each phase are connected in parallel to each other. A MOSFET (Metal-Oxide-Semiconductor Field-Effect Transistor) which includes an antiparallel diode therein or an IGBT (Insulated Gate Bipolar Transistor) is appropriate as each of the switching elements 4a1, 4a2, 5a1, 5a2, 6a1, 6a2, 4b1, 4b2, 5b1, 5b2, 6b1, and 6b2.

The control unit 7 executes PWM control on the switching elements 4a1, 4a2, 5a1, 5a2, 6a1, 6a2, 4b1, 4b2, 5b1, 5b2, 6b1, and 6b2 of the inverter circuit 3 by a PWM (Pulse Width Modulation) signal. By PWM control by the control unit 7, the inverter circuit 3 converts a direct-current voltage applied by the input circuit 2 to a variable alternating-current voltage that has a variable frequency to drive the motor 8.

Figure 2:
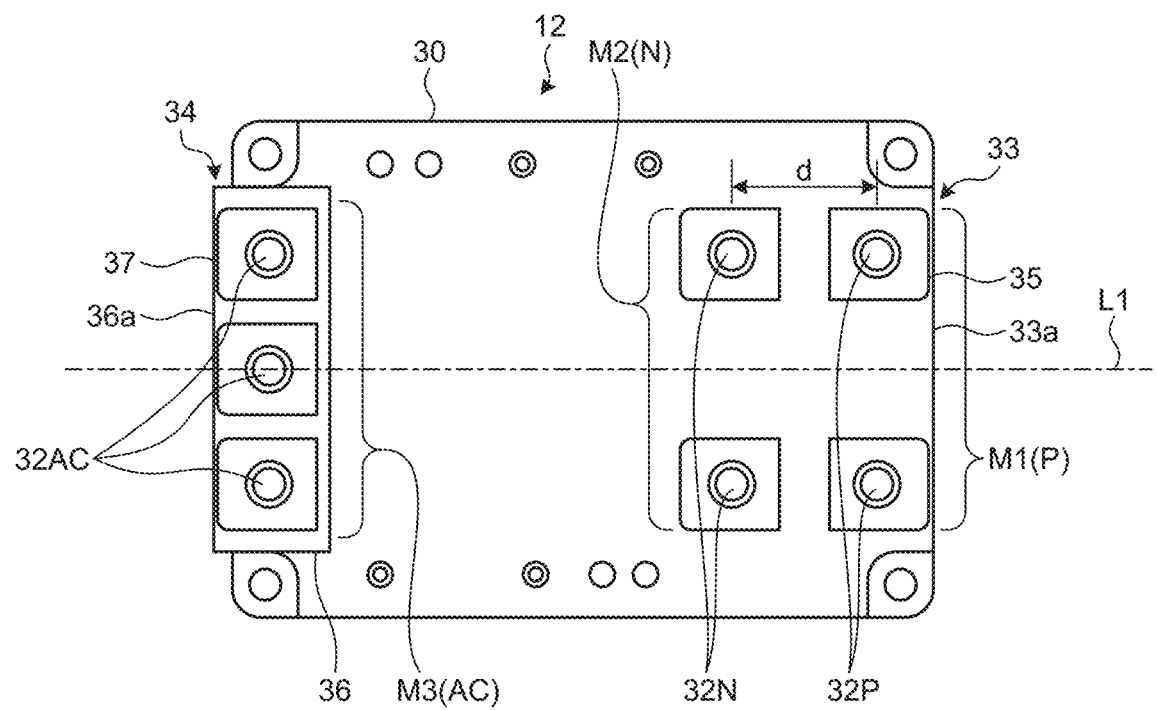
FIG. 2 is a plan view illustrating arrangement of terminals of a semiconductor module used in the power conversion device according to the first embodiment.
Figure 3:
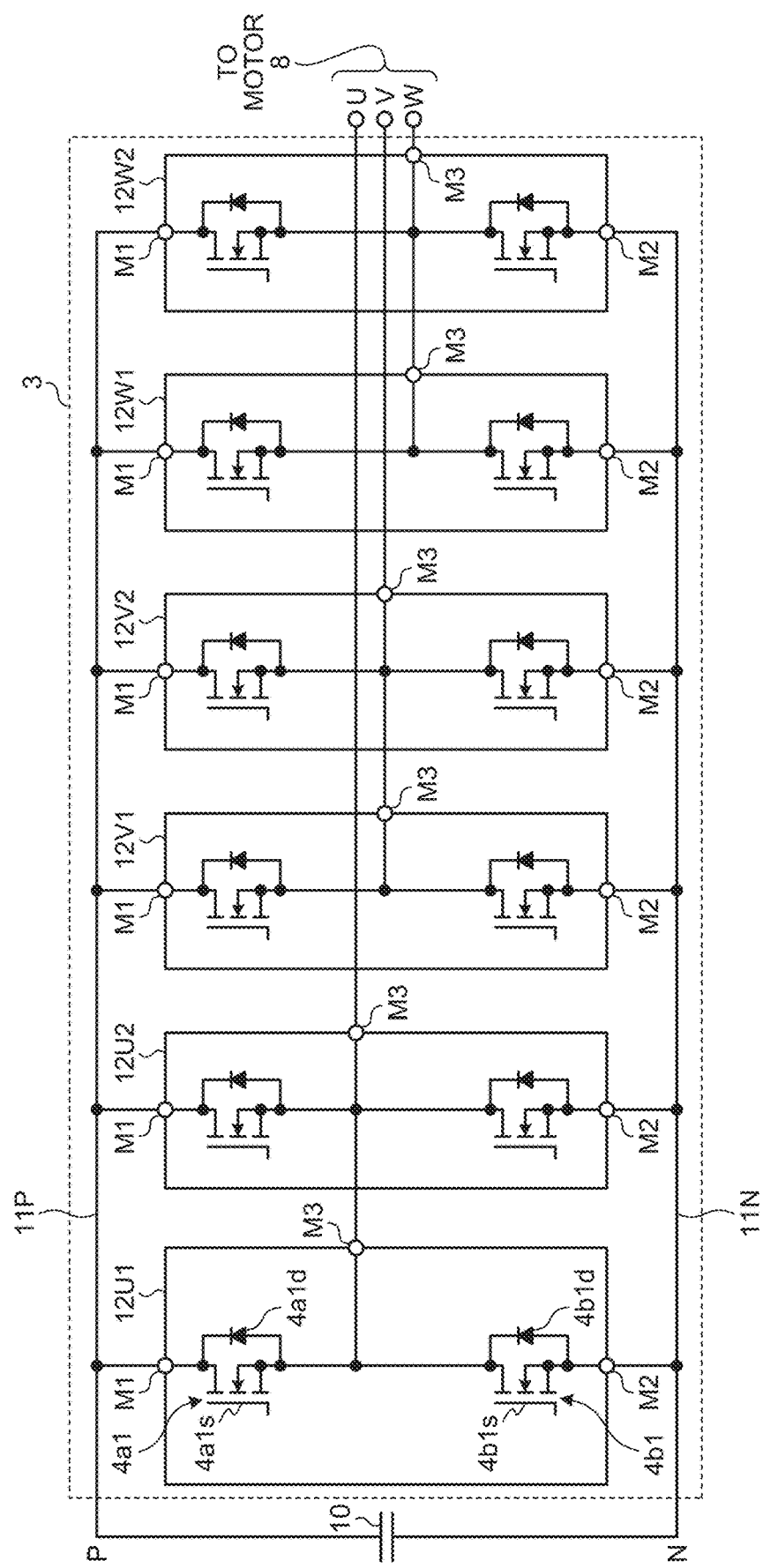
FIG. 3 is a circuit diagram of an inverter circuit illustrated in FIG. 1 to which the semiconductor module illustrated in FIG. 2 is applied.

FIG. 2 is a plan view illustrating arrangement of terminals of a semiconductor module 12 used in the power conversion device according to the first embodiment, and FIG. 3 is a circuit diagram of the inverter circuit 3 illustrated in FIG. 1 to which the semiconductor module 12 illustrated in FIG. 2 is applied.

The semiconductor module 12 used in the power conversion device according to the first embodiment includes a pair of semiconductor switching elements that are connected in series to each other in a package 30 that is a module housing, although not illustrated in FIG. 2.

As illustrated in FIG. 2, a first terminal M1, a second terminal M2, and a third terminal M3 are provided on one surface side of the package 30. The first terminal M1 configures a positive-electrode terminal P in the semiconductor module 12, the second terminal M2 configures a negative-electrode terminal N in the semiconductor module 12, and the third terminal M3 configures an alternating-current terminal AC in the semiconductor module 12.

In FIG. 3, a semiconductor module 12U1 applied to a U1 phase includes the switching element 4a1 in which a MOSFET 4a1s that is an example of a transistor element and a diode 4a1d that operates as a so-called "Free Wheeling Diode" (hereinafter, FWD) are connected in antiparallel, and the switching element 4b1 in which a MOSFET 4b1s and a FWD 4b1d are connected in antiparallel. The switching element 4a1 and the switching element 4b1 are connected in series to each other, are accommodated in the package 30 that is a module housing, and configure a switching element pair in the semiconductor module 12U1. A semiconductor module 12U2 applied to a U2 phase is also configured in an identical manner to the semiconductor module 12U1. Further, semiconductor modules 12V1, 12V2, 12W1, and 12W2 respectively applied to a V1 phase, a V2 phase, a W1 phase, and a W2 phase are also configured in an identical manner to the semiconductor module 12U1. As described above, each of the semiconductor modules 12U1, 12U2, 12V1, 12V2, 12W1, and 12W2 is a 2-in-1 module in which two switching elements connected in series to each other are accommodated.

A drain, which is a positive electrode, of the MOSFET 4a1s is electrically connected to the first terminal M1. A source, which is a negative electrode, of the MOSFET 4b1s is electrically connected to the second terminal M2. A source, which is a negative electrode, of the MOSFET 4a1s and a drain, which is a positive electrode, of the MOSFET 4b1s are electrically connected to the third terminal M3. The first terminals M1 of the semiconductor modules 12U1, 12U2, 12V1, 12V2, 12W1, and 12W2 are electrically connected to a positive-electrode side bus 11P led out from a positive-electrode terminal P of the filter capacitor 10. The second terminals M2 of the semiconductor modules 12U1, 12U2, 12V1, 12V2, 12W1, and 12W2 are electrically connected to a negative-electrode side bus 11N led out from a negative-electrode terminal N of the filter capacitor 10. The filter capacitor 10 is a capacitor that stores direct-current power required for power conversion, and is a power source in a power conversion device.

Further, the third terminal M3 of the semiconductor module 12U1 and the third terminal M3 of the semiconductor module 12U2 are electrically connected to each other to configure a U-phase alternating-current terminal, and are electrically connected to a U-phase of the motor 8. The third terminal M3 of the semiconductor module 12V1 and the third terminal M3 of the semiconductor module 12V2 are electrically connected to each other to configure a V-phase alternating-current terminal, and are electrically connected to a V-phase of the motor 8. The third terminal M3 of the semiconductor module 12W1 and the third terminal M3 of the semiconductor module 12W2 are electrically connected to each other to configure a W-phase alternating-current, terminal, and are electrically connected to a W-phase of the motor 8.

Although MOSFETs are illustrated in FIG. 3 as an example of switching elements 4a and 4b mounted on the semiconductor module 12U1, switching elements other than a MOSFET may be used. An example of a switching element other than a MOSFET is an IGBT or an IPM (Intelligent Power Module).

Referring back to FIG. 2, a configuration of each terminal in the semiconductor module 12 is described. The package 30 of the semiconductor module 12 is formed to be rectangular. Two fastening points 32P are provided in the first terminal M1, two fastening points 32N are provided in the second terminal M2, and three fastening points 32AC are provided in the third terminal M3. Because a plurality of fastening points are provided in the first terminal M1, the second terminal M2, and the third terminal M3 as described above, shunting between chips in a module is improved, providing an advantageous effect that deviation of heat generation in the module can be reduced. Although the number of the fastening points 32P in the first terminal M1 and the number of the fastening points 32N in the second terminal M2 are set to two and the number of the fastening points 32AC in the third terminal M3 is set to three in FIG. 2, the numbers of these fastening points may be changed in accordance with a current capacity. That is, the number of the fastening points 32P in the first terminal M1 and the number of the fastening points 32N in the second terminal M2 may be three or more. Further, the number of the fastening points 32AC in the third terminal M3 may be two, or four or more.

The two fastening points 32P in the first terminal M1 are provided in a short-side portion 33 that is on one side of the package 30 to be arranged in a direction perpendicular to a longitudinal direction of the package 30. The two fastening points 32N in the second terminal M2 are arranged in parallel to the arrangement of the two fastening points 32P in the first terminal M1 on an inner side of the package 30 than the first terminal M1, that is, to be closer to the center than the first terminal M1. The three fastening points 32AC in the third terminal M3 are provided in a short-side portion 34 that is on the other side of the package 30 to be arranged in the direction perpendicular to the longitudinal direction of the package 30. By these arrangements, the respective fastening points in the first terminal M1, the second terminal M2, and the third terminal M3 are arranged at symmetric positions to each other with respect to a center line L1 that connects short sides parallel to the longitudinal direction of the package 30.

One of the fastening points 32P in the first terminal M1 and one of the fastening points 32N in the second terminal M2 are spaced from each ether by a distance d. The distance d is a distance required for insulation. The distance d can be determined in accordance with a difference between a voltage applied to the first terminal M1 and a voltage applied to the second terminal M2, that is, a potential difference between, the first terminal M1 and the second terminal M2.

The two fastening points 32P in the first terminal M1 are arranged as close as possible to one side 33a of the short-side portion 33 on one side of the package 30 in such a manner that an outer side 35 of the fastening point 32P is along the side 33a. Further, in the short-side portion 34 on the other side of the package 30, a pedestal portion 36 is provided for allowing the three fastening points 32AC in the third terminal M3 to be mounted. The three fastening points 32AC in the third terminals M3 are arranged as close as possible to one longitudinal side 36a of the pedestal portion 36 in such a manner that an outer side 37 of the fastening point 32AC is along the side 36a.

By configuring the two fastening points 32P in the first terminal M1 and the three fastening points 32AC in the third terminal M3 in the manner described above, it is possible to ensure a mounting area of a semiconductor element to be accommodated in the package 30, while suppressing increase of the size of the package 30 that is a housing of the semiconductor module 12.

Although the first terminal M1 is arranged in an outer portion of the package 30 and the second terminal M2 is arranged in an inner portion of the package 30 in FIG. 2, the arrangement relation therebetween may be reversed. That is, the second terminal M2 may be arranged in the outer portion of the package 30 and the first terminal M1 may be arranged in the inner portion of the package 30.

Figure 4:
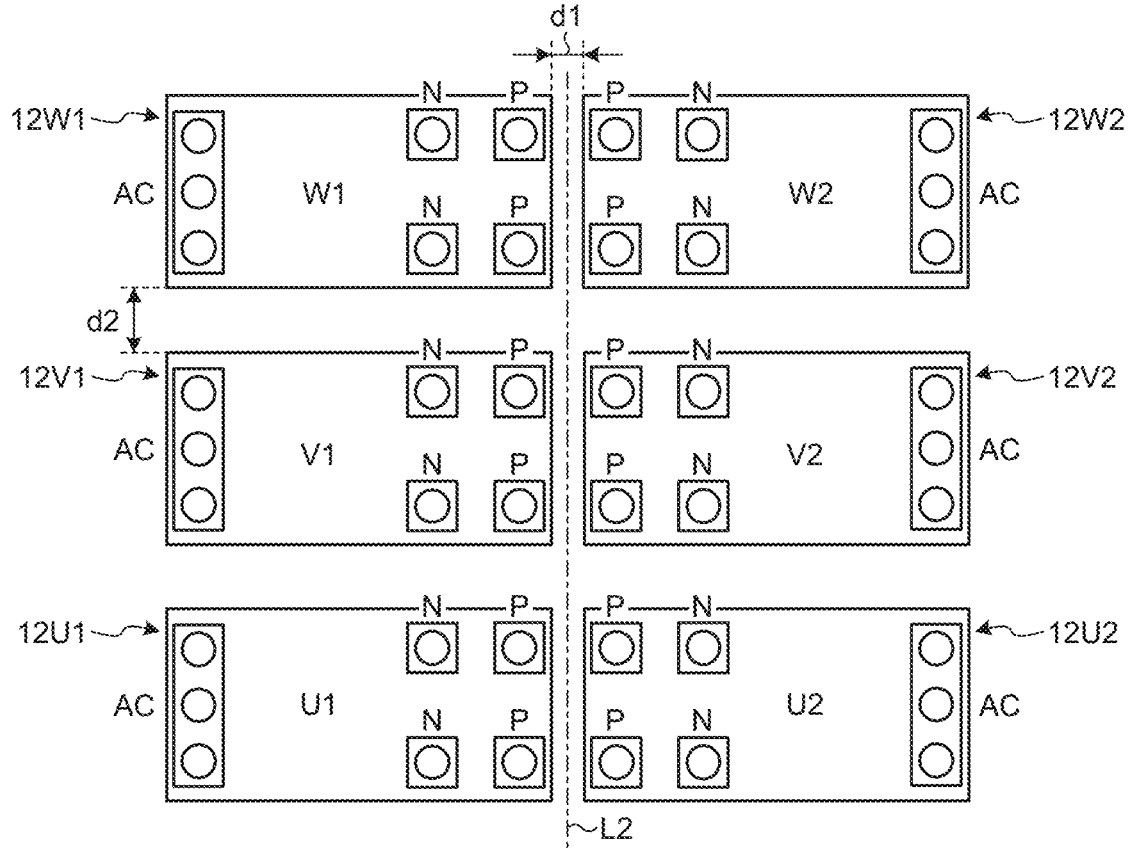
FIG. 4 is a diagram schematically illustrating an arrangement example of six semiconductor modules in the power conversion device according to the first embodiment.

Next, arrangement of six semiconductor modules in the power conversion device according to the first embodiment is described, referring to FIG. 4. FIG. 4 is a diagram schematically illustrating an arrangement example of six semiconductor modules in the power conversion device according to the first embodiment.

Features of the arrangement of six semiconductor modules in the power conversion device according to the first embodiment are as follows. In the following descriptions, the first terminal M1 (P) is called "positive-electrode direct-current terminal", the second terminal M2 (N) is called "negative-electrode direct-current terminal", and the third terminal M3 (AC) is called "alternating-current terminal".

(1) Positive-electrode direct-current terminals of two semiconductor modules that configure semiconductor modules of the same phase are arranged to be opposed to each other.

(2) When two semiconductor modules configuring semiconductor modules of the same phase are grouped into a semiconductor module group, three semiconductor module groups are arranged in a direction perpendicular to an arrangement direction of the two semiconductor modules in the semiconductor module group.

(3) Positive-electrode direct-current terminals, negative-electrode direct-current terminals, and alternating-current terminals in the semiconductor module group are each arranged at symmetric positions with respect to a center line L2 that is parallel to a short side of each semiconductor module.

(4) Positive-electrode direct-current terminals in the semiconductor modules of the same phase are arranged to be close to each other. A module-to-module distance d1 in the semiconductor modules of the same phase is smaller than a distance between the semiconductor module groups, that is, a module-to-module distance d2 in the semiconductor modules of different phases.

The features described above are further explained. In FIG. 4, the semiconductor module 12W2 configuring the W2 phase corresponds to the semiconductor module 12W1 configuring the W1 phase that has been rotated by 180 degrees around an axis perpendicular to a plane on which the semiconductor module 12W1 is arranged. That is, the semiconductor module 12W1 and the semiconductor module 12W2 have a relation of rotational symmetry. Further, the semiconductor module 12W1 and the semiconductor module 12W2 are mirror images of each other with respect to the center line L2. That is, the semiconductor module 12W1 and the semiconductor module 12W2 have a relation of line symmetry.

The reason why the relation of rotational symmetry and the relation of line symmetry are both satisfied as described above is that fastening points in the first terminal M1, the second terminal M2, and the third terminal M3 are arranged to be line-symmetric with respect to the center line L1 of the package 30, as illustrated in FIG. 2. Therefore, the positive-electrode direct-current terminals in the semiconductor modules of the same phase are opposed to each other. The positive-electrode direct-current terminals are terminals that are changed while being the same potential as each other, irrespective of whether the semiconductor modules 12 are for the same phase or different phases. The potentials when the inverter circuit 3 performs a power conversion operation are also changed while being the same potential as each other. Therefore, the potential difference between the terminals becomes zero theoretically, so that the opposed positive-electrode direct-current terminals can be made close to each other. Accordingly, the module-to-module distance d1 can be reduced.

The advantageous effects described above are obtained in an identical manner also in a case where the negative-electrode direct-current terminals are arranged in side portions to be opposed to be each other.

Figure 5:
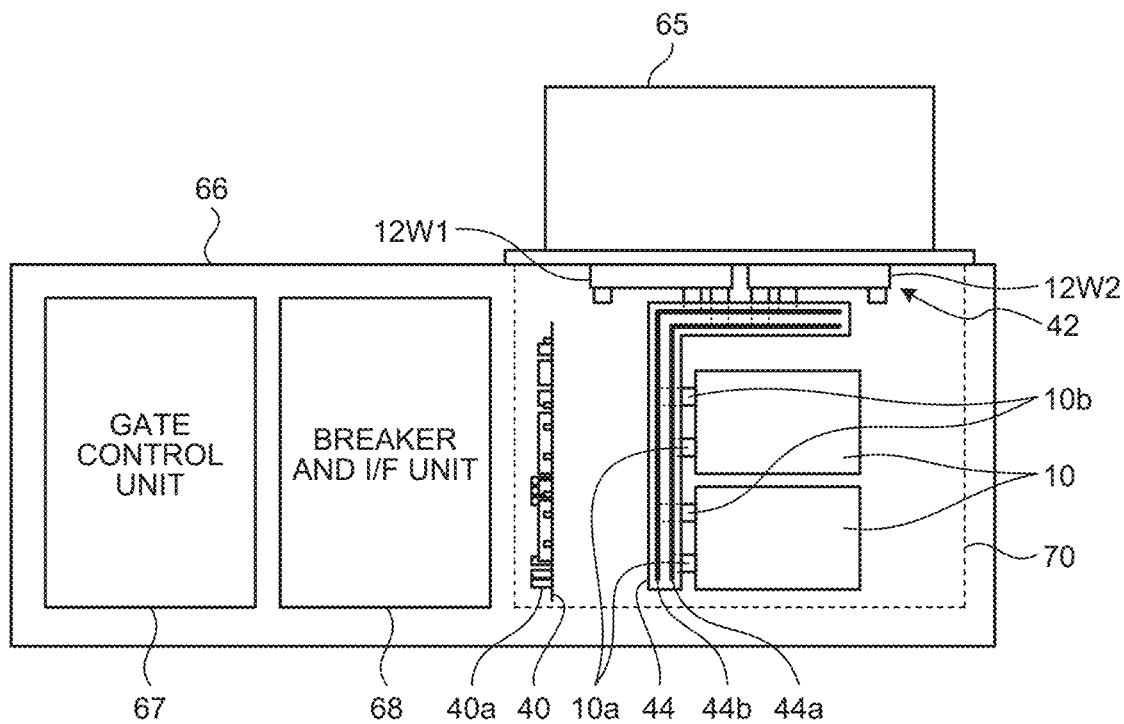
FIG. 5 is a diagram illustrating a configuration example of the power conversion device according to the first embodiment mounted on a railway vehicle.
Figure 6:
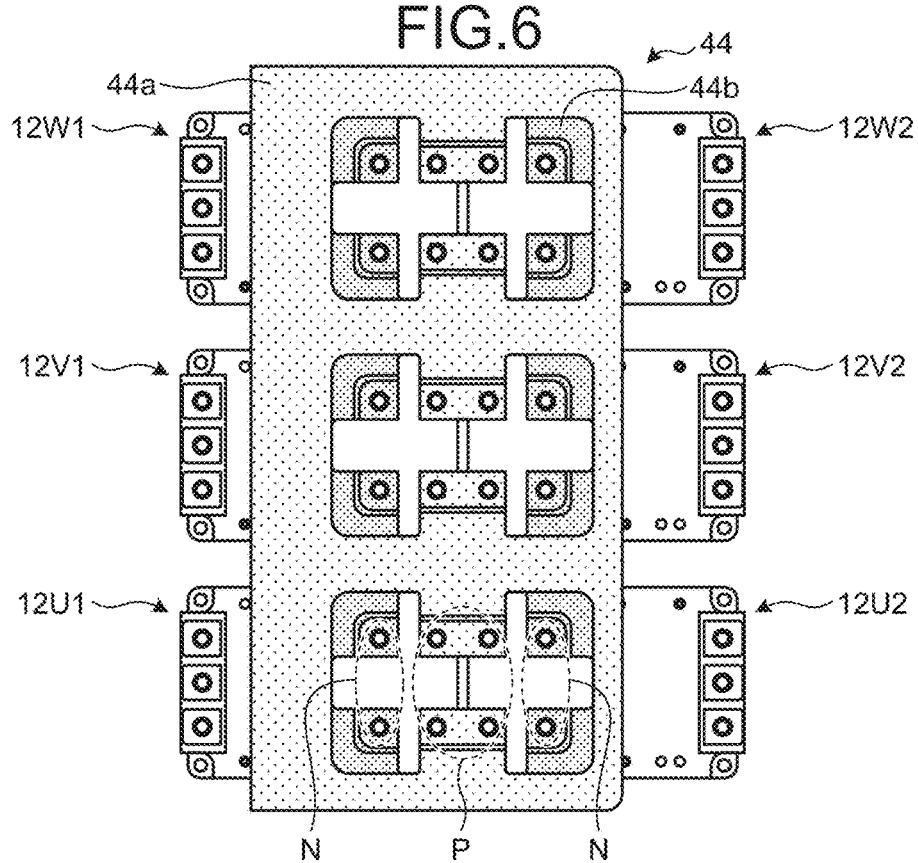
FIG. 6 is a plan view illustrating a state of connection between a laminated busbar and a semiconductor module.

FIG. 5 is a diagram illustrating a configuration example of the power conversion device according to the first embodiment mounted on a railway vehicle, and is a top view illustrating inside of the power conversion device as seen from above the vehicle toward a rail. FIG. 6 is a plan view illustrating a state of connection between a laminated busbar and a semiconductor module.

As illustrated in FIG. 5, the power conversion device is configured to include a radiator 65, a gate control unit 67, a breaker and I/F unit 68, and an inverter device 70. The inverter device 70 includes a gate-driving-circuit board 40, the filter capacitor 10, an element portion 42, and a laminated busbar 44. When this power conversion device is actually mounted on a vehicle, components other than the radiator 65, that is, the gate control unit 67, the breaker and I/F unit 68, and the inverter device 70 are accommodated in a housing 66 and are shielded from outside air. Meanwhile, the radiator 65 is attached to outside of the housing 66 to be in contact with outside air, thereby being capable of being cooled by cooling air.

The element portion 42 is a component that includes a plurality of the semiconductor modules 12 illustrated in FIG. 2. FIG. 5 illustrates the semiconductor modules 12W1 and 12W2 as the element portion 42. The gate-driving-circuit board 40 is a board with a gate driving circuit 40a mounted thereon. The gate driving circuit 40a generates a driving signal required for PWM-driving the semiconductor modules 12 as the element portion 42. The breaker and I/F unit 68 is a component that has a function of cutting off a current flowing to the inverter device 70 and a function of transmission and reception of a signal between the gate control unit 67 and the gate driving circuit 40a.

The filter capacitor 10 and the semiconductor modules 12 configuring the element portion 42 are coupled to each other by the laminated busbar 44 formed in an L-shape. The laminated busbar 44 is a part including a thin metal plate and an insulating member that are integrally covered by a laminate material. FIG. 5 illustrates a first conductor portion 44a forming the thin metal plate and a second conductor portion 44b. A multilayer busbar that is not covered by a laminate material may be used in place of the laminated busbar 44.

As illustrated in FIG. 6, the first conductor portion 44a in the laminated busbar 44 is electrically connected to positive-electrode direct-current terminals of the semiconductor modules 12U1, 12U2, 12V1, 12V2, 12W1, and 12W2, and the second conductor portion 44b is electrically connected to negative-electrode direct-current terminals of the semiconductor modules 12U1, 12U2, 12V1, 12V2, 12W1, and 12W2.

Further, as illustrated in FIG. 5, the first conductor portion 44a in the laminated busbar 44 is electrically connected to a positive-electrode terminal 10a of the filter capacitor 10, and the second conductor portion 44b in the laminated busbar 44 is electrically connected to a negative-electrode terminal 10b of the filter capacitor 10. By these connections, each of the semiconductor modules 12U1, 12U2, 12V1, 12V2, 12W1, and 12W2 that configure the element portion 42, and the filter capacitor 10 are electrically connected to each other.

In order to realize the circuit configurations illustrated in FIGS. 1 and 3, it suffices to electrically connect the alternating-current terminals AC of the semiconductor modules of the same phase to each other, although not illustrated in FIGS. 5 and 6. In this case, the configuration of the laminated busbar 44 illustrated in FIGS. 5 and 6 may be changed and used, or a laminated busbar different from the laminated busbar 44 or a conductor busbar may be used.

As described above, according to the power conversion device according to the first embodiment, in a semiconductor module group formed by two semiconductor modules that configure semiconductor modules of the same phase among six semiconductor modules, first terminals or second terminals of the two semiconductor modules are arranged to be opposed to each other. Also, three semiconductor module groups are arranged in a direction perpendicular to an arrangement direction of the two semiconductor modules in the semiconductor module group. Therefore, the distance between two parallel-arranged semiconductor modules can be made small, so that it is possible to further downsize the power conversion device including an inverter circuit.

Second Embodiment

Figure 7:
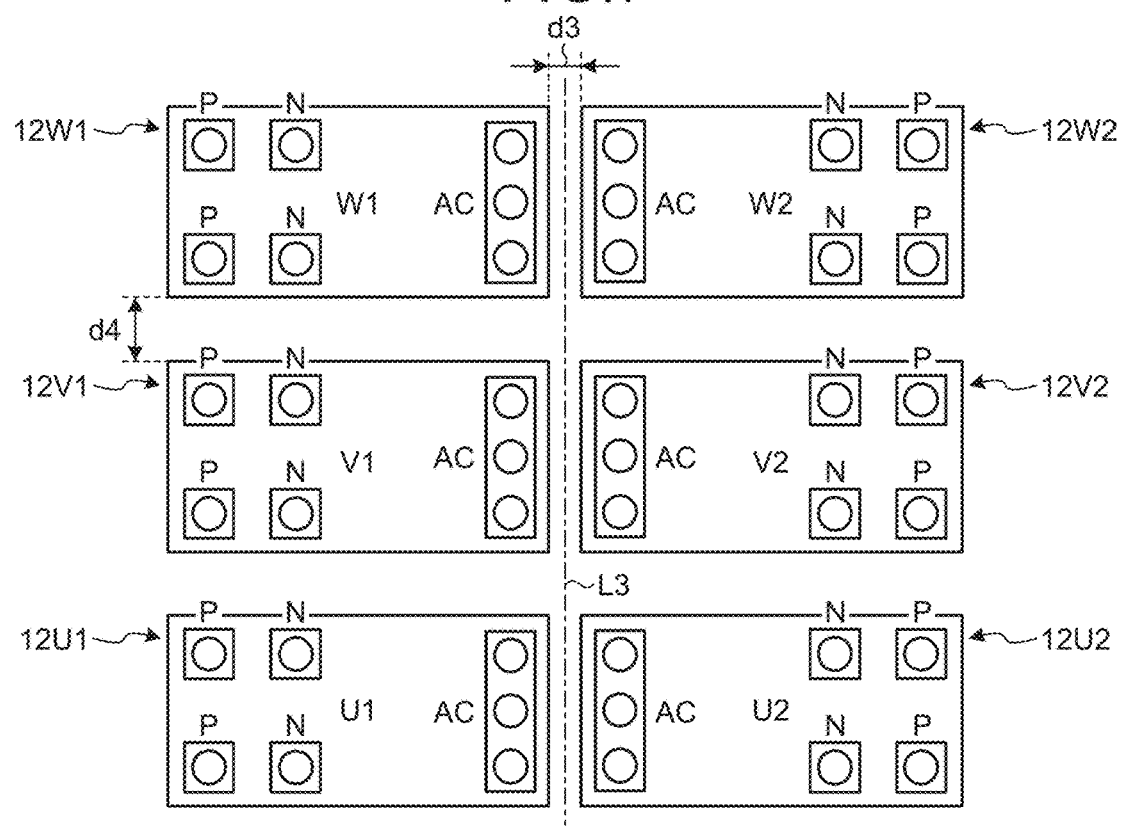
FIG. 7 is a diagram schematically illustrating an arrangement example of six semiconductor modules in a power conversion device according to a second embodiment.

FIG. 7 is a diagram schematically illustrating an arrangement example of six semiconductor modules in a power conversion device according to a second embodiment. In the first embodiment, positive-electrode direct-current terminals in two semiconductor modules that configure semiconductor modules of the same phase are arranged to be opposed to each other, as illustrated in FIG. 4. On the other hand, in the second embodiment, alternating-current terminals in two semiconductor modules that configure semiconductor modules of the same phase are arranged to be opposed to each other, as illustrated in FIG. 7. Other configurations of the second embodiment are like or equivalent to those of the first embodiment, and like or equivalent constituent elements as those of the first embodiment are denoted by like reference signs and redundant explanations thereof are omitted.

In addition to the features described above, the configuration of the second embodiment has the following features.

(1) Similarly to the configuration of the first embodiment, three semiconductor module groups are arranged in a direction perpendicular to an arrangement direction of two semiconductor modules in the semiconductor module group.

(2) Positive-electrode direct-current terminals, negative-electrode direct-current terminals, and alternating-current terminals in the semiconductor module group are each arranged at symmetric positions with respect to a center line L3 that is parallel to a short side of each semiconductor module.

(3) Alternating-current terminals in the semiconductor modules of the same phase are arranged to be close to each other. A module-to-module distance d3 in the semiconductor modules of the same phase is smaller than the distance between the semiconductor module groups, that is, a module-to-module distance d4 in the semiconductor modules of different phases.

In the configuration of the second embodiment, the alternating-current terminals of the same phase are terminals that are changed while being the same potential as each other. The potentials when the inverter circuit 3 performs a power conversion operation are also changed while being the same potential as each other. Therefore, the potential difference between the terminals becomes zero theoretically, so that the opposed alternating-current terminals can be made close to each other. Accordingly, the module-to-module distance d3 can be reduced.

As described above, according to the power conversion device according to the second embodiment, in a semiconductor module group formed by two semiconductor modules that configure semiconductor modules of the same phase among six semiconductor modules, third terminals of the two semiconductor modules are arranged to be opposed to each other. Also, three semiconductor module groups are arranged in a direction perpendicular to an arrangement direction of the two semiconductor modules in the semiconductor module group. Therefore, the distance between two parallel-arranged semiconductor modules can be made small, so that it is possible to further downsize the power conversion device including an inverter circuit.

Third Embodiment

While the first and second embodiments have described a case where the semiconductor module 12 illustrated in FIG. 2 is applied to the inverter circuit 3, a third embodiment describes a case where the semiconductor module 12 illustrated in FIG. 2 is applied to a converter circuit.

Figure 8:
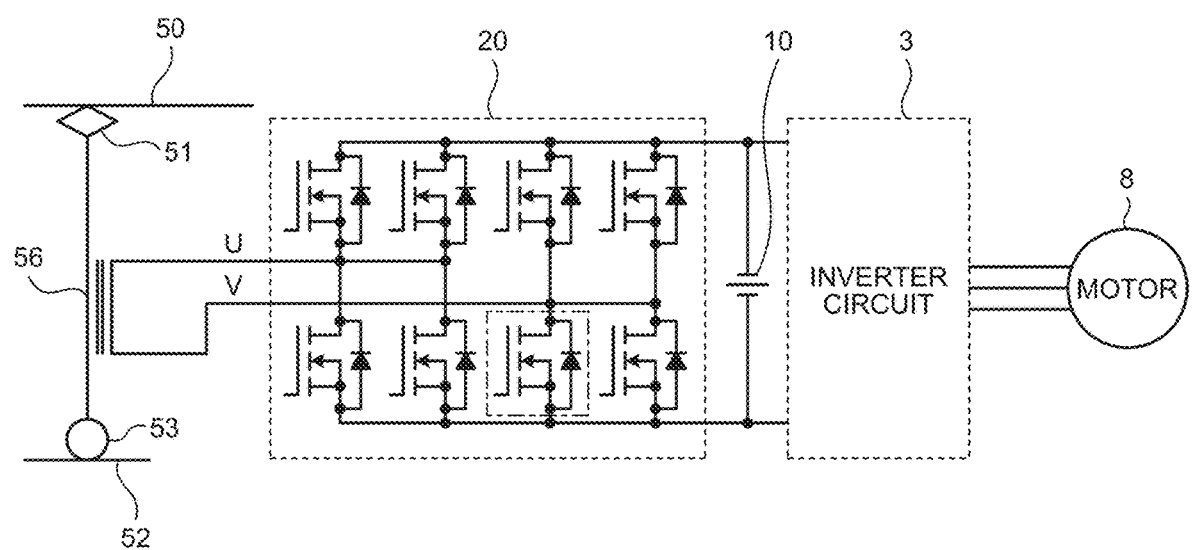
FIG. 8 is a diagram illustrating a configuration example of a power conversion device according to a third embodiment.

FIG. 8 is a diagram illustrating a configuration example of a power conversion device according to the third embodiment. The power conversion device according to the third embodiment illustrated in FIG. 8 is a configuration example of a power conversion device applied to an electric vehicle that has an alternating-current input, and is configured to include a converter circuit 20, the filter capacitor 10, and the inverter circuit 3.

In FIG. 8, an alternating-current voltage collected from the overhead line 50 via the current collector 51 is stepped down by a transformer 56 and is then converted to a direct-current voltage by the converter circuit 20. The converted direct-current voltage passes through the filter capacitor 10, is converted by the inverter circuit 3 to an arbitrary alternating-current voltage that has an arbitrary frequency, and is applied to the motor 8 to drive the motor 8.

The converter circuit 20 illustrated in FIG. 8 also has a configuration in which each phase has two legs each configured by a positive-side switching element and a negative-side switching element connected in series to each other, similarly to the first embodiment. Therefore, by configuring the converter circuit 20 to use four semiconductor modules 12U1, 12U2, 12V1, and 12V2 in the configuration of FIG. 4 or 7, the converter circuit 20 can be downsized.

As described above, according to the power conversion device according to the third embodiment, in a semiconductor module group formed by two semiconductor modules that configure semiconductor modules of the same phase among four semiconductor modules, first terminals, second terminals, or third terminals of the two semiconductor modules are arranged to be opposed to each other. Also, two semiconductor module groups are arranged in a direction perpendicular to an arrangement direction of the two semiconductor modules in the semiconductor module group. Therefore, the distance between two parallel-arranged semiconductor modules can be made small, so that it is possible to further downsize the power conversion device including a converter circuit.

Fourth Embodiment

The first and second embodiments have described a case where one or a plurality of motors S are driven by using a three-phase inverter circuit in which a first leg and a second leg of each phase are connected in parallel to each other, as the inverter circuit 3. In a fourth embodiment, a case is described where one or a plurality of motors 8 are driven by using two three-phase inverter circuits that are configured without connecting the first leg and the second leg in parallel to each other.

Figure 9:
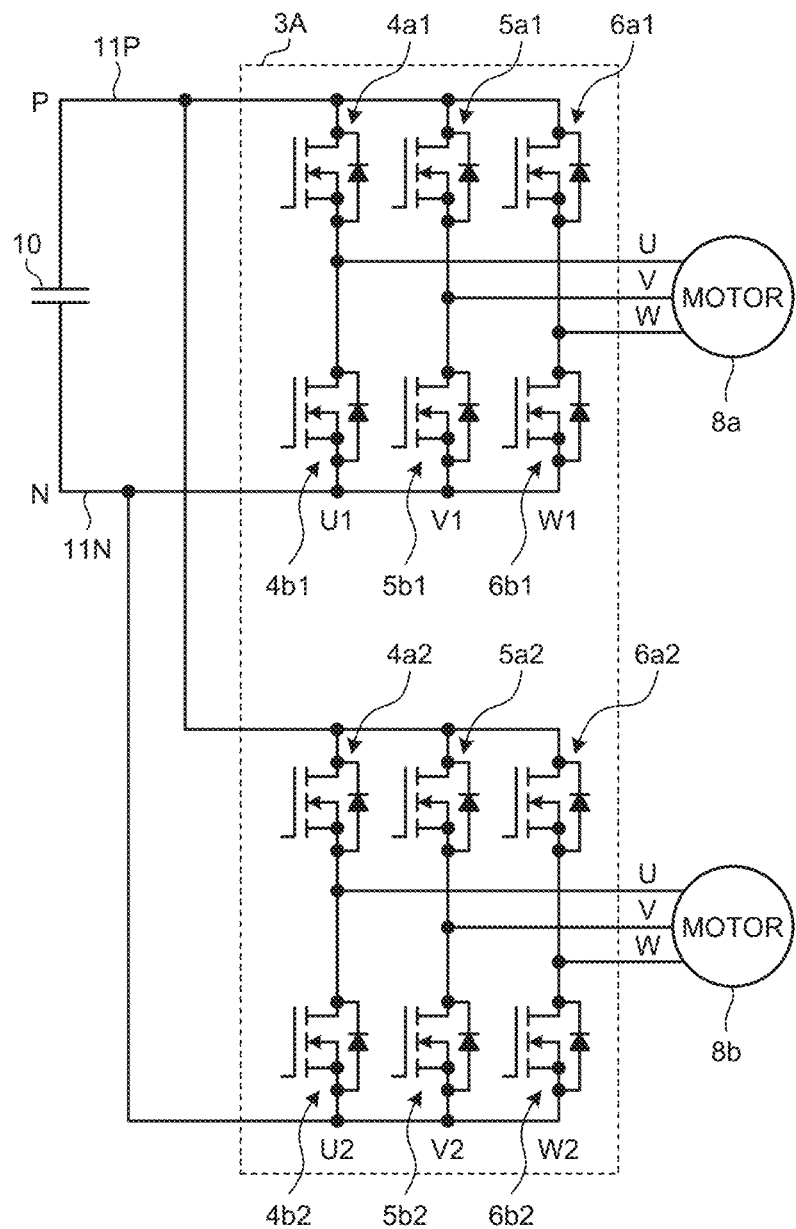
FIG. 9 is a diagram illustrating a circuit configuration of an inverter circuit used in a power conversion device according to a fourth embodiment.

FIG. 9 is a diagram illustrating a circuit configuration of an inverter circuit 3A used in a power conversion device according to the fourth embodiment. Like or equivalent constituent elements as those of the first embodiment illustrated in FIG. 1 or FIG. 3 are denoted by like reference signs.

The inverter circuit 3A illustrated in FIG. 9 is identical to the inverter circuit 3 illustrated in FIG. 1 or FIG. 3 in that it includes the switching elements 4a1, 4a2, 5a1, 5a2, 5a1, 6a2, 4b1, 4b2, 5b1, 5b2, 6b1, and 6b2, but is different in that the first leg and the second leg of each phase are not connected in parallel to each other.

FIG. 9 illustrates a configuration in which one of three-phase inverter circuits configuring the inverter circuit 3A drives a motor 8a and the other three-phase inverter circuit configuring the inverter circuit 3A drives a motor 8b. However, the motors 8a and 8b may be one or plural. Also in the first embodiment, the motor 8 driven by the Inverter circuit 3 may be one or plural. This point is common to both the first embodiment and the fourth embodiment.

The arrangement example illustrated in FIG. 4 or FIG. 7 can be employed also in the configuration of the inverter circuit 3A illustrated in FIG. 9. Further, in this case, the circuit configuration becomes such that a drain of a positive-electrode side switching element is electrically connected to the positive-electrode side bus 11P, and a source of a negative-electrode side switching element is electrically connected to the negative-electrode side bus 11N, as illustrated in the circuit diagram in FIG. 9. Therefore, it is possible to connect the semiconductor module 12 and the filter capacitor 10 to each other by using the laminated busbar 44 illustrated in FIGS. 5 and 6.

The configurations described in the above embodiments are only examples of the content of the present invention. The configurations can be combined with other well-known techniques, and a part of each configuration can be omitted or modified without departing from the scope of the present invention.

REFERENCE SIGNS LIST 2 input circuit, 3, 3A inverter circuit, 4a1, 4a2, 5a1, 5a2, 5a1, 6a2, 4b1, 4b2, 5b1, 5b2, 6b1, 6b2 switching element, 7 control unit, 8, 8a, 8b motor, 10 filter capacitor, 10a positive-electrode terminal, 10b negative-electrode terminal, 11P positive-electrode side bus, 11N negative-electrode side bus, 12, 12U1, 12U2, 12V1, 12V2, 12W1, 12W2 semiconductor module, 20 converter circuit, 30 package, 32P, 32N, 32AC fastening point, 33, 34 short-side portion, 33a, 35, 36a, 37 side, 36 pedestal portion, 40 gate-driving-circuit board, 40a gate driving circuit, 42 element portion, 44 laminated busbar, 44a first conductor portion, 44b second conductor portion, 50 overhead line, 51 current collector, 52 rail, 53 wheel, 56 transformer, 65 radiator, 66 housing, 67 gate control unit, 68 breaker and I/F unit, 70 inverter device.

The invention claimed is:

1. A power conversion device using a semiconductor module that includes a pair of semiconductor switching elements connected in series to each other, comprising the semiconductor modules number of which is an even number of four or more, wherein
the semiconductor module includes a first terminal, a second terminal, and a third terminal on its surface, a plurality of fastening points are provided in the first terminal, the second terminal, and the third terminal, a positive electrode of a positive-side switching element is electrically connected to the first terminal, a negative electrode of a negative-side switching element is electrically connected to the second terminal, and a negative electrode of the positive-side switching element and a positive electrode of the negative-side switching element are electrically connected to the third terminal,
first terminals, second terminals, or third terminals of two semiconductor modules configuring a semiconductor module group of a same phase among the semiconductor modules number of which is an even number of four or more are arranged to be opposed to each other, and
a plurality of the semiconductor module groups are arranged in a direction perpendicular to an arrangement direction of two semiconductor modules in the semiconductor module group.

2. The power conversion device according to claim 1, wherein
number of the semiconductor modules is six, and
the six semiconductor modules are used to configure a three-phase inverter circuit including two parallel-connected semiconductor modules for each phase.

3. The power conversion device according to claim 1, wherein
number of the semiconductor modules is four, and
the four semiconductor modules are used to configure a converter circuit including two parallel-connected semiconductor modules for each phase.

4. The power conversion device according to claim 1, wherein
number of the semiconductor modules is six, and
the six semiconductor modules are used to configure two three-phase inverter circuits.

5. The power conversion device according to claim 1, wherein
the first terminal is a positive-electrode direct-current terminal,
the second terminal is a negative-electrode direct-current terminal, and
the third terminal is an alternating-current terminal.

6. The power conversion device according to claim 1, wherein
the plurality of fastening points in the first terminal are arranged in a short-side portion on one side of a module housing in a direction perpendicular to a longitudinal direction of the module housing,
the plurality of fastening points in the second terminal are arranged in parallel to arrangement of the plurality of fastening points in the first terminal on an inner side of the module housing than the first terminal, and
the plurality of fastening points in the third terminal are arranged in a short-side portion on the other side of the module housing in a direction perpendicular to the longitudinal direction of the module housing.

7. The power conversion device according to claim 2, wherein
the first terminal is a positive-electrode direct-current terminal,
the second terminal is a negative-electrode direct-current terminal, and
the third terminal is an alternating-current terminal.

8. The power conversion device according to claim 3, wherein
the first terminal is a positive-electrode direct-current terminal,
the second terminal is a negative-electrode direct-current terminal, and
the third terminal is an alternating-current terminal.

9. The power conversion device according to claim 4, wherein
the first terminal is a positive-electrode direct-current terminal,
the second terminal is a negative-electrode direct-current terminal, and
the third terminal is an alternating-current terminal.

10. The power conversion device according to claim 2, wherein the plurality of fastening points in the first terminal are arranged in a short-side portion on one side of a module housing in a direction perpendicular to a longitudinal direction of the module housing,
the plurality of fastening points in the second terminal are arranged in parallel to arrangement of the plurality of fastening points in the first terminal on an inner side of the module housing than the first terminal, and
the plurality of fastening points in the third terminal are arranged in a short-side portion on the other side of the module housing in a direction perpendicular to the longitudinal direction of the module housing.

11. The power conversion device according to claim 3, wherein the plurality of fastening points in the first terminal are arranged in a short-side portion on one side of a module housing in a direction perpendicular to a longitudinal direction of the module housing,
the plurality of fastening points in the second terminal are arranged in parallel to arrangement of the plurality of fastening points in the first terminal on an inner side of the module housing than the first terminal, and
the plurality of fastening points in the third terminal are arranged in a short-side portion on the other side of the module housing in a direction perpendicular to the longitudinal direction of the module housing.

12. The power conversion device according to claim 4, wherein the plurality of fastening points in the first terminal are arranged in a short-side portion on one side of a module housing in a direction perpendicular to a longitudinal direction of the module housing,
the plurality of fastening points in the second terminal are arranged in parallel to arrangement of the plurality of fastening points in the first terminal on an inner side of the module housing than the first terminal, and
the plurality of fastening points in the third terminal are arranged in a short-side portion on the other side of the module housing in a direction perpendicular to the longitudinal direction of the module housing.

13. The power conversion device according to claim 5, wherein the plurality of fastening points in the first terminal are arranged in a short-side portion on one side of a module housing in a direction perpendicular to a longitudinal direction of the module housing, the plurality of fastening points in the second terminal are arranged in parallel to arrangement of the plurality of fastening points in the first terminal on an inner side of the module housing than the first terminal, and the plurality of fastening points in the third terminal are arranged in a short-side portion on the other side of the module housing in a direction perpendicular to the longitudinal direction of the module housing.

14. The power conversion device according to claim 7, wherein the plurality of fastening points in the first terminal are arranged in a short-side portion on one side of a module housing in a direction perpendicular to a longitudinal direction of the module housing, the plurality of fastening points in the second terminal are arranged in parallel to arrangement of the plurality of fastening points in the first terminal on an inner side of the module housing than the first terminal, and the plurality of fastening points in the third terminal are arranged in a short-side portion on the other side of the module housing in a direction perpendicular to the longitudinal direction of the module housing.

15. The power conversion device according to claim 8, wherein the plurality of fastening points in the first terminal are arranged in a short-side portion on one side of a module housing in a direction perpendicular to a longitudinal direction of the module housing, the plurality of fastening points in the second terminal are arranged in parallel to arrangement of the plurality of fastening points in the first terminal on an inner side of the module housing than the first terminal, and the plurality of fastening points in the third terminal are arranged in a short-side portion on the other side of the module housing in a direction perpendicular to the longitudinal direction of the module housing.

16. The power conversion device according to claim 9, wherein the plurality of fastening points in the first terminal are arranged in a short-side portion on one side of a module housing in a direction perpendicular to a longitudinal direction of the module housing, the plurality of fastening points in the second terminal are arranged in parallel to arrangement of the plurality of fastening points in the first terminal on an inner side of the module housing than the first terminal, and the plurality of fastening points in the third terminal are arranged in a short-side portion on the other side of the module housing in a direction perpendicular to the longitudinal direction of the module housing.

\* \* \* \* \*